(12) United States Patent
Mukai

(10) Patent No.: US 7,130,892 B2
(45) Date of Patent: Oct. 31, 2006

(54) METHOD AND SYSTEM FOR MUSIC DISTRIBUTION

(75) Inventor: Syunichi Mukai, Fujisawa (JP)

(73) Assignee: International Business Machines Corporation, Armonk, NY (US)

(*) Notice: Subject to any disclaimer, the term of this patent is extended or adjusted under 35 U.S.C. 154(b) by 562 days.

(21) Appl. No.: 09/965,940

(22) Filed: Sep. 27, 2001

(65) Prior Publication Data
US 2002/0062261 A1  May 23, 2002

(30) Foreign Application Priority Data
Sep. 28, 2000  (JP) ............................. 2000-296329

(51) Int. Cl.
  *G06F 15/16* (2006.01)
(52) U.S. Cl. .................. 709/219; 709/217; 84/634; 84/615; 84/609; 84/622
(58) Field of Classification Search ................ 709/231, 709/217, 225, 219, 203, 232, 224, 227, 221, 709/202, 228, 229, 238; 707/104, 8, 1, 5, 707/100; 725/91; 717/171; 715/500, 841; 84/609; 381/81; 713/201; 705/1, 10, 26, 705/14, 52, 59
See application file for complete search history.

(56) References Cited

U.S. PATENT DOCUMENTS

| | | | | |
|---|---|---|---|---|
| 5,724,521 A | * | 3/1998 | Dedrick ........................ | 705/26 |
| 5,734,119 A | * | 3/1998 | France et al. .................. | 84/622 |
| 5,778,187 A | * | 7/1998 | Monteiro et al. ............ | 709/231 |
| 5,781,889 A | * | 7/1998 | Martin et al. .................... | 705/1 |
| 5,808,224 A | * | 9/1998 | Kato ............................. | 84/609 |
| 5,824,934 A | * | 10/1998 | Tsurumi et al. ................ | 84/609 |
| 5,918,213 A | * | 6/1999 | Bernard et al. ............... | 705/26 |
| 5,930,765 A | * | 7/1999 | Martin ......................... | 705/14 |

(Continued)

FOREIGN PATENT DOCUMENTS

JP  PUPA07-202816  8/1995

(Continued)

OTHER PUBLICATIONS

WebInEssence: A Personalized Web-Based Multi-Document..—Radev, Zhang ; perun.si.umich.edu/~radev/papers/naccl-summ01.ps.*

(Continued)

*Primary Examiner*—Thong Vu
(74) *Attorney, Agent, or Firm*—Duke W. Yee; Jerry W. Herndon; Betty Formby

(57) ABSTRACT

According to the first aspect, the present invention provides a music distribution method for downloading, in response to a request from a user, music data for one or more musical pieces included in the latest hit charts from a server storing a lot of music data, comprising the steps of determining whether music data to be downloaded from said server are already stored in a terminal of said user, and downloading, from said server to said terminal, only music data that are not stored in said terminal. According to the second aspect, the present invention provides a music distribution system comprising a server for storing a lot of music data, and means responsive to a request from a user for downloading, from said server, music data for one or more musical pieces included in the latest hit charts, wherein said downloading means including means for determining whether music data to be downloaded from said server are already stored in a terminal of said user, and means for selectively downloading, from said server to said terminal, only music data that are not stored in said terminal.

15 Claims, 6 Drawing Sheets

U.S. PATENT DOCUMENTS

| | | | |
|---|---|---|---|
| 5,930,768 A * | 7/1999 | Hooban | 705/27 |
| 5,941,947 A * | 8/1999 | Brown et al. | 709/225 |
| 5,953,005 A * | 9/1999 | Liu | 715/500.1 |
| 5,959,945 A * | 9/1999 | Kleiman | 381/81 |
| 6,073,124 A * | 6/2000 | Krishnan et al. | 705/59 |
| 6,076,111 A * | 6/2000 | Chiu et al. | 709/232 |
| 6,112,239 A * | 8/2000 | Kenner et al. | 709/224 |
| 6,147,949 A * | 11/2000 | Yamagishi | 369/47.13 |
| 6,195,678 B1* | 2/2001 | Komuro | 709/202 |
| 6,219,698 B1* | 4/2001 | Iannucci et al. | 709/221 |
| 6,252,153 B1* | 6/2001 | Toyama | 84/634 |
| 6,256,028 B1* | 7/2001 | Sanford et al. | 715/841 |
| 6,308,204 B1* | 10/2001 | Nathan et al. | 709/229 |
| 6,314,565 B1* | 11/2001 | Kenner et al. | 717/171 |
| 6,336,219 B1* | 1/2002 | Nathan | 725/91 |
| 6,421,675 B1* | 7/2002 | Ryan et al. | 707/100 |
| 6,434,622 B1 | 8/2002 | Monteiro et al. | 709/231 |
| 6,446,111 B1* | 9/2002 | Lowery | 709/203 |
| 6,473,756 B1* | 10/2002 | Ballard | 707/6 |
| 6,496,205 B1* | 12/2002 | White et al. | 715/824 |
| 6,564,213 B1* | 5/2003 | Ortega et al. | 707/5 |
| 6,567,847 B1* | 5/2003 | Inoue | 709/219 |
| 6,578,051 B1* | 6/2003 | Mastronardi et al. | 707/104.1 |
| 6,578,069 B1* | 6/2003 | Hopmann et al. | 709/203 |
| 6,587,127 B1* | 7/2003 | Leeke et al. | 715/765 |
| 6,600,898 B1* | 7/2003 | De Bonet et al. | 455/3.04 |
| 6,605,769 B1* | 8/2003 | Juszkiewicz | 84/609 |
| 6,640,306 B1* | 10/2003 | Tone et al. | 713/201 |
| 6,657,116 B1* | 12/2003 | Gunnerson | 84/615 |
| 6,662,231 B1* | 12/2003 | Drosset et al. | 709/229 |
| 6,668,158 B1* | 12/2003 | Tsutsui et al. | 455/12.1 |
| 6,799,201 B1* | 9/2004 | Lee et al. | 709/217 |
| 6,826,546 B1* | 11/2004 | Shuster | 705/52 |
| 6,877,037 B1* | 4/2005 | Adachi | 709/227 |
| 6,889,325 B1* | 5/2005 | Sipman et al. | 713/176 |
| 6,947,922 B1* | 9/2005 | Glance | 707/3 |
| 6,990,453 B1* | 1/2006 | Wang et al. | 704/270 |
| 7,058,694 B1* | 6/2006 | De Bonet et al. | 709/217 |
| 7,072,846 B1* | 7/2006 | Robinson | 705/10 |
| 2001/0025259 A1* | 9/2001 | Rouchon | 705/26 |
| 2002/0032019 A1* | 3/2002 | Marks et al. | 455/414 |
| 2002/0049717 A1* | 4/2002 | Routtenberg et al. | 707/1 |
| 2002/0082901 A1* | 6/2002 | Dunning et al. | 705/10 |
| 2002/0087662 A1* | 7/2002 | Bouet | 709/219 |
| 2002/0091455 A1* | 7/2002 | Williams | 700/94 |
| 2002/0120925 A1* | 8/2002 | Logan | 725/9 |
| 2002/0157034 A1* | 10/2002 | Sagar | 714/4 |
| 2002/0180803 A1* | 12/2002 | Kaplan et al. | 345/840 |
| 2003/0028889 A1* | 2/2003 | McCoskey et al. | 725/91 |
| 2003/0165136 A1* | 9/2003 | Cornelius et al. | 370/356 |
| 2004/0030741 A1* | 2/2004 | Wolton et al. | 709/202 |
| 2004/0117272 A1* | 6/2004 | Shehab | 705/27 |
| 2005/0038819 A1* | 2/2005 | Hicken et al. | 707/104.1 |
| 2005/0083870 A1* | 4/2005 | Koga et al. | 370/319 |
| 2005/0198377 A1* | 9/2005 | Ferguson et al. | 709/238 |
| 2006/0101132 A1* | 5/2006 | Arisawa et al. | 709/219 |
| 2006/0159109 A1* | 7/2006 | Lamkin et al. | 370/401 |
| 2006/0161635 A1* | 7/2006 | Lamkin et al. | 709/217 |

FOREIGN PATENT DOCUMENTS

| | | |
|---|---|---|
| JP | PUPA08-102933 | 4/1996 |
| JP | PUPA08-185194 | 7/1996 |
| JP | PUPA 09-288635 | 11/1997 |
| JP | PUPA10-091500 | 4/1998 |
| JP | PUPA10-124069 | 5/1998 |
| JP | PUPA10-232684 | 9/1998 |
| JP | PUPA11-073360 | 3/1999 |
| JP | PUPA11-275268 | 10/1999 |
| JP | PUPA11-312175 | 11/1999 |
| JP | PUPA 11-328851 | 11/1999 |
| JP | 2000-076542 | 3/2000 |
| JP | 2002-083190 | 3/2002 |

OTHER PUBLICATIONS

Tune Retrieval in the Multimedia Library—Mcnab, Smith, Witten, Henderson (1996) ; www.nzdl.org/publications/1996/RJM-LAS-IHW-CLH-Tune-Ret.ps.*

COSMOS: Our Database Vision—Our Vision ; www-dbs.ethz.ch/download/Group_Description_LaTeX.ps.gz.*

Extending Mobile-IPv6 with Multicast to Support Mobile. . —Ernst, Castellucia, Lach www.inrialpes.fr/planete/people/ccastel/ecum.ps.*

Copyright Infringement on the World Wide Web—Atkins www.eecs.umich.edu/-aprakash/585/html/copyright.pdf.*

Optimal Buffering Policy for Downloading Music in ..—Networks Mohit Agarwal wow.eecs.berkeley.edu/mohit/wcnc.ps.*

Electronic music: new ways to play; Paradiso, J.A.; □□Spectrum, IEEE; vol. 34, Issue 12, Dec. 1997 pp.18-30.*

The MP3 revolution; McCandless, M.; □□Intelligent Systems and Their Applications, IEEE [see also IEEE Intelligent Systems]□□vol. 14, Issue 3, May-Jun. 1999 pp. 8-9.*

Vocal interfaces to musical material; Kahrs, M.;□□Applications of Signal Processing to Audio and Acoustics, 1999 IEEE Workshop on □□Oct. 17-20 1999 pp. 107-110.*

Estimation of the Mixture Transition Distribution Model—Berchtold (1999) □□stat.washington.edu/www/research/reports/1999/tr352.ps.*

Music Understanding At The Beat Level Real-time Beat Tracking..—Goto, Muraoka (1997) □□www.etl.go.jp/etl/divisions/~ goto/PAPER/CASA95.300dpi.ps.*

Melody based tune retrieval over the World Wide Web—David Bainbridge Rodger (1998) □□www.cs.waikato.ac.nz/~nzdl/publications/1998/Bainbridge-McNab-Smith-Melody.ps.*

Tossing Algebraic Flowers down the Great Divide—Goguen (1999) □□www-cs.ucsd.edu/users/goguen/pubs/../ps/tcs97.ps.gz.*

A Combinatorial Approach to Content-based Music Selection—Pachet, Roy, Cazaly (2000) □□www.cs.vu.nl/~eliens/online/papers/midi/local/pachetf.ps.*

Tossing Algebraic Flowers down the Great Divide—Goguen (1999) www-cs.ucsd.edu/users/goguen/pubs/../ps/tcs97.ps.gz.*

Real-Time Streaming of Multichannel Audio Data over..—Xu, Woszczyk, Settel.. (2000) www.cim.mcgill.ca/~jer/pub/aes.pdf.*

Internet Peer-to-Peer Technology Pricing Schemes as Seen .. —Kim, Hoffman (2000) www.seas.gwu.edu/~cpi/library/docs/cpi-2000-01.pdf.*

Private LAN Architecture: Reff;ective Architecture for Home LAN..—Okamura (2000) (Correct) www.comp.lancs.ac.uk/computing/rm2000/papers/27-idiucedoka.ps.gz.*

* cited by examiner

| RANKING | TITLE | SINGER | POINTER |
|---|---|---|---|
| 1 | | | |
| 2 | | | |
| 3 | | | |
| ⋮ | ⋮ | ⋮ | ⋮ |
| 10 | | | |

METHOD AND SYSTEM FOR MUSIC DISTRIBUTION

FIELD OF THE INVENTION

The present invention relates to music distribution, and in particular, to a method and a system for efficiently downloading, to a user terminal, musical pieces (e.g., top-ten musical pieces) included in the latest hit charts.

BACKGROUND ART

With the spread of the Internet, it has become common to conduct various transactions on the Internet, including music distribution. In the music distribution, a lot of music contents are stored in a server, and music contents requested by a user are downloaded to a terminal of that user with charge. The downloaded musical pieces can be played back by a personal computer or by a portable music playback terminal. Several music distribution sites have now been established that distribute music contents with a price of several hundreds yen per piece. Since this price is considerably lower than that of a single CD, and the music contents can be electronically stored and handled in a convenient way, it is expected that the music distribution will become ever more popular.

While various genres of music, such as classics, pop, popular ballads, latin and rock, can be downloaded from a music distribution site, users, especially young users, would exhibit a strong preference for the latest hit songs. Therefore, taking this tendency into consideration, some music distribution sites feature a list of top ten or more songs on the latest hit charts on the web.

As prior art for downloading the latest hit music, an information distribution system and a reception apparatus are disclosed in Japanese Published Unexamined Patent Application No. H11-150517. According to this system, distribution list information (hit charts list), including next distribution list information, is transmitted, along with music data, by a distribution center to a reception site, and at the reception site, a determination is made, based on the distribution list information, as to which music data should be downloaded. When the music data that is selected in this manner corresponds to songs included in the next distribution list information, at the reception site a reception waiting state is assumed, and no request is transmitted the distribution center.

Further, an also well known technique is disclosed in Japanese Published Unexamined Patent Application No. H11-312175. According to this technique, instead of downloading music data directly to a user terminal, only the information that is required for downloading to be performed is received from a music distribution server and is stored on a recording medium, such as an MD (mini disk). Subsequently, after the recording medium has been loaded into an information terminal set up in a CD shop or a convenience store and a predetermined fee has been paid, music data corresponding to the information stored on the recording medium is downloaded from the music distribution server.

Conventionally, to download music listed on the latest hit charts, a user would first identify songs that are ranked at the higher places, e.g., top ten songs, on the Web of a music distribution site, and then select a song or songs that have been newly added to the top ten list and downloads them. However, it would be troublesome for a user to check what songs are listed on the hit charts each time the user downloads a song or songs. Further, even after new song has been downloaded, if a user desires to sequentially play back, in order, the top ten songs on the hit charts, the user would have to change the music playback order, or if it is troublesome, the user would have to download the top ten songs every week.

SUMMARY OF THE INVENTION

It is, therefore, an object of the present invention to provide a method and a system for efficiently downloading music data, in a form transparent to a user, for one or more musical pieces on the latest hit charts.

It is another object of the invention to provide a method and a system for efficiently downloading only music data that are ranked at the first to predetermined places on the latest hit charts and not stored in a user's terminal.

According to a first aspect of the invention, a music distribution method for downloading, in response to a request from a user, music data for one or more musical pieces included in the latest hit charts from a server storing a lot of music data, comprising the steps of determining whether music data to be downloaded from said server are already stored in a terminal of said user, and downloading, from said server to said terminal, only music data that are not stored in said terminal, is provided.

According to a second aspect of the invention, a music distribution system comprising a server for storing a lot of music data, and means responsive to a request from a user for downloading, from said server, music data for one or more musical pieces included in the latest hit charts, wherein said downloading means including means for determining whether music data to be downloaded from said server are already stored in a terminal of said user, and means for selectively downloading, from said server to said terminal, only music data that are not stored in said terminal, is provided.

According to the preferred embodiments of the invention, music data to be downloaded are those which are ranked at the first to predetermined places on the latest hit charts and not stored in the user terminal. In addition to the music data, a latest hit charts list including places, titles and singer names is downloaded to thereby update a hit charts list of the user. Storage capacity of the user terminal can be saved by deleting, at the time of downloading, music data of musical pieces which are no longer included in the latest hit charts. The determination process in the first and the second aspects of the present invention may be performed by comparing the titles of musical pieces included in the latest hit charts list with those in the hit charts list of the user.

The preferred embodiments of the present invention will now be described in detail with reference to the accompanying drawings.

DESCRIPTION OF THE PREFERRED EMBODIMENTS

Figure 1:
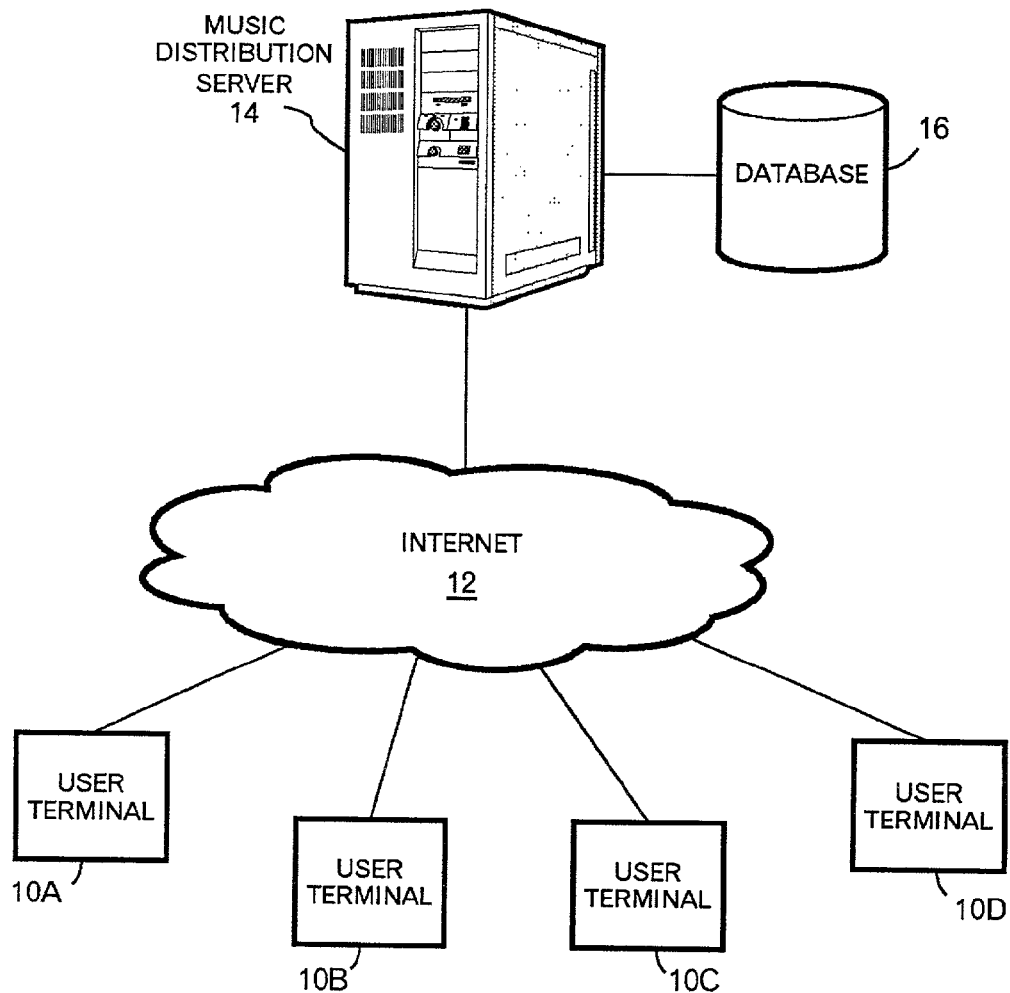
FIG. 1 is a schematic block diagram illustrating the configuration of a system according to the present invention.

FIG. 1 is a schematic diagram showing the configuration of a system in which the present invention can be implemented. In the system of FIG. 1, multiple user terminals 10A to 10D (hereinafter generically referred to as user terminals 10) can access a music distribution server 14 across the Internet 12. The music distribution server 14 includes a database 16 in which a lot of music data and user registration information are stored, and downloads selected music data in response to a request from a user. In addition to the music data and the user registration information, the latest hit charts list is also recorded in the database 16, and for the music pieces included in the list (e.g., top 100), their places on the latest hit charts are associated with the music data.

A basic flow for the music distribution implemented in the system of FIG. 1 will now be explained with reference to a flowchart shown in FIG. 2. First, at step 1, a user accesses the music distribution server 14 using, for example, a web browser to download music pieces on the latest hit charts. When the access is successful, the user requests music pieces (e.g., top ten songs) listed on the latest hit charts at step 2. When the hit charts musical pieces are requested, the latest hit charts list stored in the database 16 of the music distribution server 14 is compared with a hit charts list stored in the terminal of the requesting user at step 3. Finally, at step 4, only musical pieces that are not stored in the user terminal are downloaded. While the detailed process will be described later, the comparison process at step 3 may be performed by the music distribution server 14, the user terminal 10, or a dedicated downloading device (not shown) set up in a shop such as a convenience store.

Figure 2:
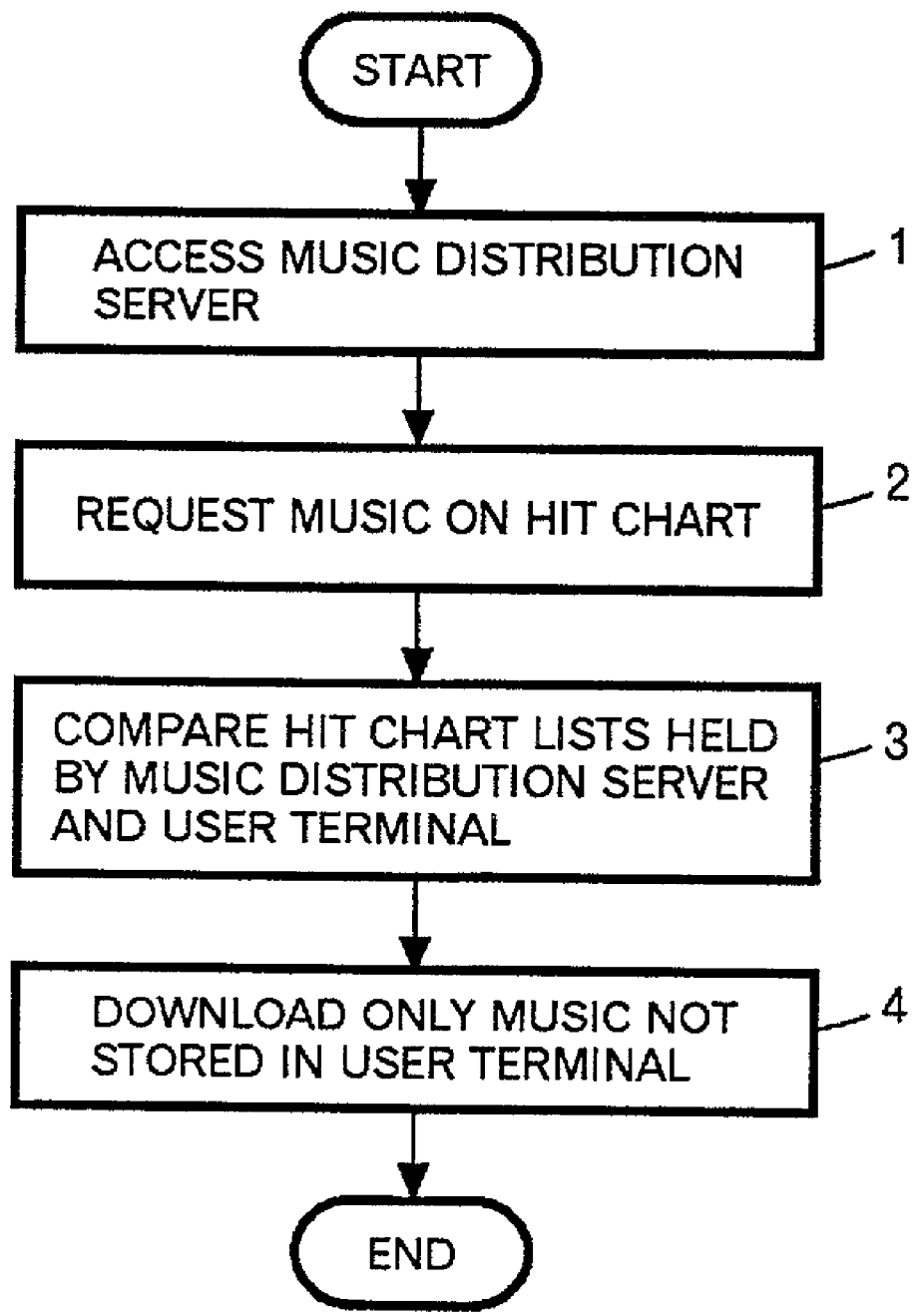
FIG. 2 is a flowchart showing a basic flow for music distribution implemented in the system of FIG. 1.
Figure 3:
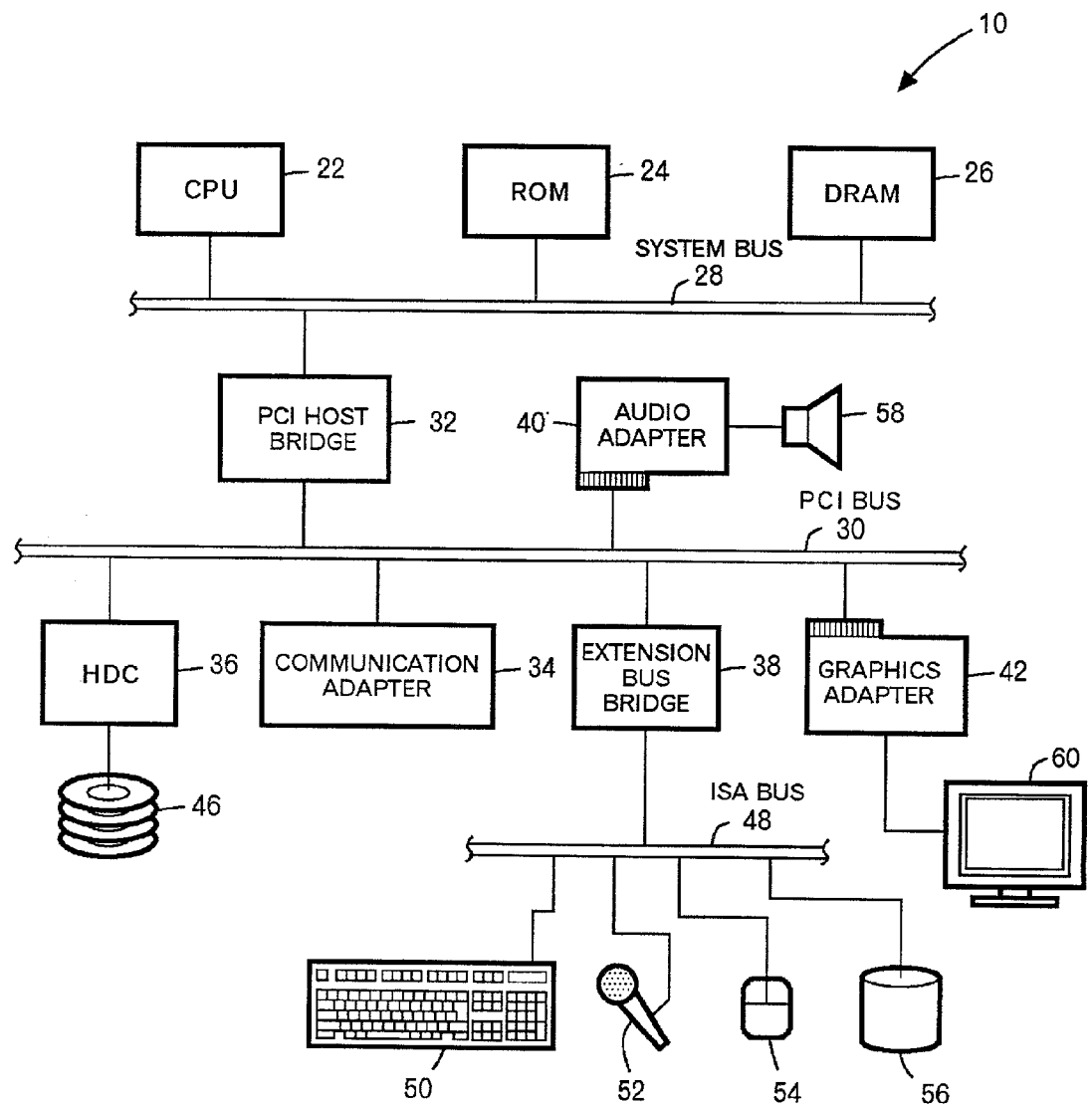
FIG. 3 is a block diagram showing an exemplary arrangement of a user terminal to which music data are downloaded.

FIG. 3 illustrates a typical configuration of the user terminal 10 that downloads the music data on the latest hit charts in accordance with the flowchart of FIG. 2. While the exemplary configuration of FIG. 3 assumes data downloading using a personal computer, the user terminal 10 may be a personal portable terminal that can play back music, as will be described later. The user terminal 10 comprises a central processing unit (CPU) 22, a read only memory (ROM) 24 and a dynamic random access memory (DRAM) 26, all of which are connected to a system bus 28. The CPU 22, the ROM 24 and the DRAM 26 are also connected to a PCI local bus 30 via a PCI host bridge 32. With this arrangement, the CPU 22 can access various PCI devices connected to the PCI local bus 30. The PCI host bridge 32 also provides a high band path along which the PCI device can access the DRAM 26.

A communication adapter (modem) 34, a hard disk controller (HDC) 36, an extension bus bridge 38, an audio adapter 40 and a graphics adapter 42 are connected to the PCI local bus 30. The communication adapter 34 is used to connect the user terminal 10 to the Internet 12 so as to facilitate the downloading of music data from the music distribution server 14. The hard disk controller 36 is used to control a hard disk drive 46 on which an operating system, application programs and data are stored. The extension bus bridge 38 is used to connect an ISA bus 48 to the PCI local bus 30.

As shown in FIG. 3, several user input devices can be connected to the ISA bus 48, and in the illustrated example, a keyboard 50, a microphone 52 and a pointing device (mouse) 54 are connected. A portable player 56, which plays back downloaded music, may also be connected to the ISA bus 48. If the portable player 56 is of a USB connection type, it is connected to the user terminal 10 via a USB interface (not shown). The audio adapter 40 controls audio output to a speaker 58, and the graphics adapter 42 controls visual output to a display monitor 60. In the user terminal 10 shown in FIG. 3, musical pieces downloaded from the music distribution server 14 can be played back through the speaker 58 or the portable player 56. Since all the components of the user terminal 10 are well known in the art, no detailed explanations thereof will be given.

The overview of the procedure for downloading selected music data from the music distribution server 14 to the user terminal 10 has been described with reference to FIG. 2, and its details will now be described with reference to a flowchart shown in FIG. 4. The first step 70 is the same as step 1 in FIG. 2 in which a user accesses the music distribution server 14 by using a web browser such as Netscape Navigator or Internet Explorer. When the access is successful, the initial screen (homepage) of the music distribution server 14 is displayed on the display monitor 60 of the user terminal 10. While not shown in the drawing, a member registration button and a log in button are provided on the initial screen to allow a user, who desires to download musical pieces on the latest hit charts for the first time, to perform a member registration process, and a user, who has already been registered, to log in and request downloading of the latest hit songs.

Figure 5:
FIG. 5 illustrates an exemplary screen for member registration.

When, at step 71, the user selects member registration, the flow proceeds to the registration step 72 where, as shown in FIG. 5, the user is prompted to input personal information such as address, name and credit card number of the user. In addition to the input of the personal information, the user can specify, in a field 80, up to what place from the top on the latest hit charts be downloaded. Choices such as top three, top ten and top twenty may be presented by the server, or the user may specify a desired place on the charts. Adjacent to the field 80, a price per piece may be shown for the convenience of the user. While a detailed description will be given later, even when the user specifies downloading of the top ten, not all the top ten music pieces will be downloaded; only new pieces or songs that are not stored in the user terminal are downloaded.

Since the registration works for the fields other than the field 80 are well known works performed at many sites, no detailed explanation thereof will be given. For example, it is well known in the art that when a triangular mark 81 shown at the right of the "credit card company" field is clicked, a list of credit card companies is displayed to allow the user to select one of them. When the user completes inputting the information and clicks a "completed" button 82, the registration process ends and the information input by the user is stored in the database 16 of the music distribution server 14. The flow then proceeds to step 73 to allow the user to log in by inputting a user ID (normally a mail address input at the time of registration is used) and a password. If the registration process at step 72 takes time and the login will not be permitted until the next access, the flow terminates after step 72.

The user, if registered, can proceed to a process for downloading musical pieces listed on the latest hit charts by selecting login at step 73. For a user who has selected neither the member registration nor the login, other services including an audio trial service may be provided (step 74). When the user who has selected login at step 73 inputs a user ID and a password following instructions on the screen, a new screen such as shown in FIG. 6 is displayed on which the user can request downloading of musical pieces listed on the latest hit charts (step 75).

Figures 6, 7:
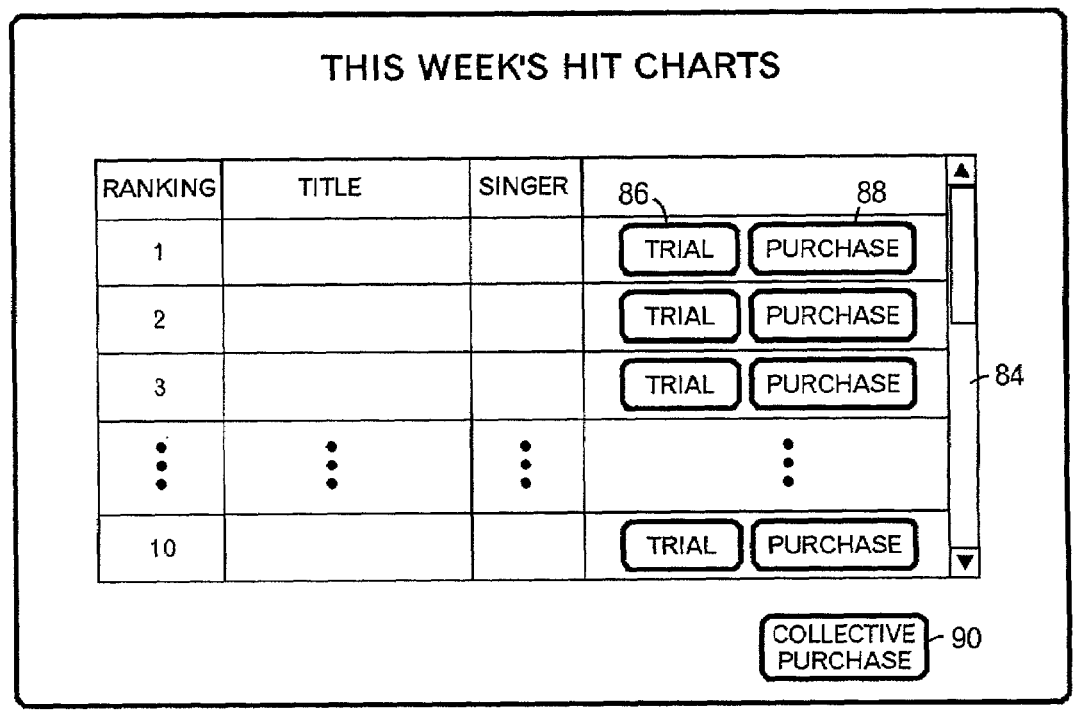
FIG. 6 illustrates an exemplary hit charts screen that is displayed when a user logs in by inputting a user ID and a password.
FIG. 7 illustrates an exemplary hit charts list held by a user.

FIG. 6 illustrates an exemplary screen titled "this week's hit charts" on which titles and singer names of top ten songs on the latest hit charts are displayed. The user can see up to, for example, the 100th place on the hit charts by operating a scroll bar 84 on the right of the screen. An audio trial button 86 and a purchase button 88 are provided to the right of each music piece. While these buttons are also provided in the existing music distribution sites, the present invention additionally provides a button 90 for collectively purchasing several music pieces ranked high on the hit charts. The user, who has specified a place on the hit charts up to which musical pieces are to be downloaded, can download only new musical pieces which the user does not have among those which are ranked at the first to the specified places, by clicking the collective purchase button 90. Assuming that the user has specified the top ten, the process will be as follows. The same process may also be performed when the user specifies another value such as top three or top twenty.

When the user clicks the collective purchase button 90, the flow proceeds to step 76 to compare the hit charts list held by the music distribution server 14 with that held by the user. While this comparison may be performed in either the user terminal 10 or the music distribution server 14, it is assumed in the following that the comparison is performed in the user terminal 10.

The music distribution server 14 has, in the database 16, a list corresponding to the hit charts shown in FIG. 6, and the user also has a similar list in, for example, the hard disk drive 46. An exemplary hit charts list held by the user is shown in FIG. 7. The list shown in FIG. 7 includes four entries, "ranking", "title", "singer" and "pointer". The "pointer" includes a start address of an area (e.g., a portion of the hard disk drive 46) in which music data of a corresponding piece are stored, and the other entries are the same as those of the music distribution server 14. The list of FIG. 7 may be used as a so-called play list. Since it is ascertained at step 75, where the user ID and the password are input, that the user has requested the top ten musical pieces, the music distribution server 14 transmits, in response to the clicking of the collective purchase button 90, the top ten list of the latest hit charts including their places, titles and singer names, to the user terminal 10. This list does not include any actual music contents or music data. The user terminal 10 stores the received list in the DRAM 26 or the hard disk drive 46, and compares, at step 76, the titles on the received list with those on the list shown in FIG. 7 that is held by the user in order to identify musical pieces disappeared from the latest hit charts and new musical pieces to be downloaded.

At step 77, music data of the pieces disappeared from the latest hit charts are deleted. It is preferable to delete unnecessary or old music data for the purpose of saving in storage capacity because several megabytes of storage per piece would be required for the music data even after compression. Of course, old music data may be retained if such consideration is not required.

When the musical pieces disappeared from the hit charts have been deleted, the flow proceeds to step 78 where the user terminal 10 transmits, for example, places or titles of new musical pieces to the music distribution server 14 to request downloading thereof. In response to the request, the music distribution server 14 downloads, to the user terminal 10, the music data and attribute data (places or titles) of the specified new musical pieces. The user terminal 10 stores the received music data on the hard disk drive 46, and stores its start address as a pointer in association with the attribute data. The pointer may be stored in the DRAM 26. Finally, the user terminal 10 updates the hit charts list held by the user based on the latest hit charts list received at step 76 (step 79). This updating may be performed by writing (overwriting) titles, singers and stored pointers of the new musical pieces at the locations on the list of FIG. 7 where the old musical pieces disappeared from the latest hit charts were entered, and by rewriting the ranking column to reflect the latest hit charts. The musical pieces can be played back following the order on the hit charts by referencing the rewritten ranking column, starting playing back from "1", and continuing in order.

If the ranking column in FIG. 7 is to be fixed to display the latest hit charts list on the display monitor 60, the original pointer values are stored in the DRAM 26 in association with the attribute data (for the ranking, it should be of the latest hit charts) so that the "pointer" column is rewritten, as needed, for a musical piece or pieces found in both the latest hit charts list and the user's old hit charts list (i.e., musical pieces that have not been downloaded this time). Then, the "title" and "singer" columns on the user list shown in FIG. 7 are updated with corresponding contents on the latest hit charts, and the pointer values stored in the DRAM 26 are written in corresponding locations in the "pointer" column, which locations can be identified from the attribute data.

As described above, the comparison at step 76 may also be performed at the music distribution server 14. In that case, the music distribution server 14 requests the user terminal 10 to transmit a user list such as shown in FIG. 7, in response to the clicking of the collective purchase button 90. Receiving this request, the user terminal 10 transmits, to the music distribution server 14, piece data on the list stored in the user terminal 10. While the piece data may consist of titles only, it is preferable to include singer data therein to cope with a rare case in which musical pieces having the same title but performed by different singers are ranked in the hit charts. This is also true for the comparison performed by the user terminal 10. The music distribution server 14 compares the received music data with those of the latest hit charts list held by the server 14 to identify musical pieces disappeared from the hit charts list of the user and musical pieces that are to be newly added. After this identification process, the music distribution server 14 requests the user terminal 10 to delete the musical pieces disappeared from the user's hit charts list (top ten list in this example), and the user terminal 10 deletes music data for the specified pieces in response to the request (step 77). After the deletion, the flow proceeds to step 78 where the music distribution server 14 downloads the latest hit charts list including places, titles and singer names (top ten list in this example), and music data and attribute data of the musical pieces that were newly added. The updating of the user list at step 79 is performed in the same manner as when the comparison of the lists is performed by the user terminal 10.

When the music distribution server 14 is in charge of the comparison of the lists, the server 14 may transmit, to the user terminal 10, piece data and latest place of any musical piece remaining in the old hit charts list held by the user terminal 10, i.e., any musical piece whose music data have not been downloaded, instead of transmitting the latest hit charts list from the music distribution server 14 to the user terminal 10. In that case, the attribute data for the new pieces transmitted from the music distribution server 14 must include all of the places, titles and singer names. The updating of the user list at step 79 is performed in the described manner.

Figure 4:
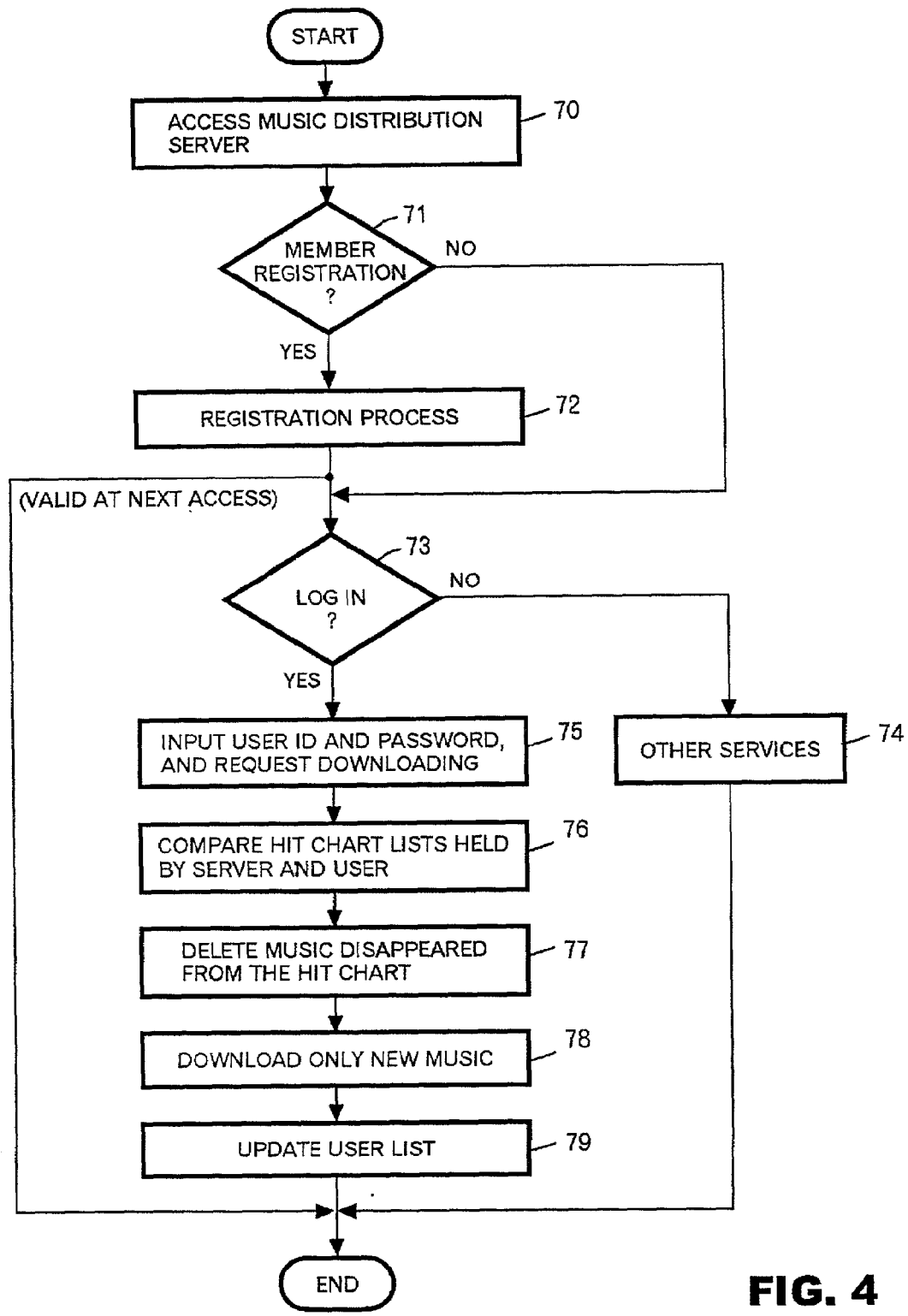
FIG. 4 is a flowchart showing a detailed flow of a music distribution service according to the invention.

In the flowchart of FIG. 4, a program corresponding to the steps to be performed by the user terminal (steps 76 to 79) is downloaded from the music distribution server 14 to the user terminal 10 after the registration at step 72 has been completed.

While the preferred embodiments using a personal computer as the user terminal 10 have been described, the present invention may also use a personal portable terminal having a music playback function to which data can be directly downloaded. However, such a portable terminal does not have sufficient power and capacity to execute the above program, and the present invention is, therefore, preferably implemented in the following manner.

First, one or more downloading terminals (not shown) for music distribution are installed and connected to the music distribution server 14 via a network that may be any network including the Internet. While the downloading terminal may be functionally similar to the user terminal shown in FIG. 3, its hardware configuration should allow a portable terminal or a storage medium loaded therein such as MD or flash memory to be attached to the terminal. In addition to the music data, the user's hit charts list shown in FIG. 7 is also stored in this storage medium. When the user attaches his/her portable terminal or storage medium to the downloading terminal and requests downloading, the downloading terminal performs steps 76 to 79 shown in FIG. 4 in response to the request. In this embodiment, even a user who has not been registered as a member may issue a download request. For example, when the downloading terminal is installed in a convenience store, the user may merely hand his/her portable terminal or storage medium to a clerk of the store and verbally ask the clerk to download the top ten musical pieces. If the user has been registered as a member in some way, the user could input his/her user ID and password in the downloading terminal to download the musical pieces.

When the download request is received, the downloading terminal first reads a user list from the storage medium of the portable terminal, downloads the latest hit charts list from the downloading site or music distribution server 14, compares the two lists (step 76), deletes data of musical pieces disappeared from the latest hit charts, if any, (step 77), downloads music data of new pieces to the storage medium (step 78), and finally updates the user list using the latest hit charts list (step 79). As described above, the comparison at step 76 may also be performed by the music distribution server 14. Further, since the latest hit charts is updated periodically (e.g., every week) in the music distribution server 14, it is not necessary to download the latest hit charts list each time step 76 is executed if the latest hit charts list is downloaded in advance from the music distribution server 14 to the downloading terminal.

By installing the downloading terminal in a convenience store, it is possible to construct a music distribution system that is very convenient for a user of a portable terminal because the member registration is not required, and payment can be done at the convenience store.

While the preferred embodiments of the present invention have been explained, it should be apparent to those skilled in the art that the present invention is not limited to these embodiments and various modifications and changes can be made.

The invention claimed is:

1. A music distribution method for downloading, in response to a request from a user, music data for one or more musical pieces included in a given latest hits chart from a server storing a lot of music data, comprising the steps of:
    receiving said request at said server, wherein said request contains a chosen number associated with a given latest hits chart;
    on said given latest hits chart, selecting musical pieces that have a numerical ranking not greater than said chosen number;
    for each musical piece selected, determining music data to be downloaded, said music data associated with respective selected musical pieces;
    determining whether music data to be downloaded from said server are already stored in a terminal of said user; and
    downloading, from said server to said terminal, only music data that are not stored in said terminal.

2. The music distribution method according to claim 1, further comprising the steps of:
    downloading a latest hit charts list including places, titles and singer names to said terminal from said server; and
    updating a hit charts list of the user stored in said terminal based on said latest hit charts list.

3. The music distribution method according to claim 1, further comprising the step of deleting music data that are stored in said terminal and are not included in said latest hit charts.

4. The music distribution method according to claim 2, wherein said step of determining whether music data to be downloaded from said server are already stored in a terminal of said user includes the step of comparing the titles of musical pieces on said latest hit charts list with those on said hit charts list held in said user terminal.

5. The music distribution method according to claim 4, wherein said step of determining whether music data to be downloaded from said server are already stored in a terminal of said user includes the step of transmitting said hit charts list of said user to said server, which then performs said step of comparing the titles or musical pieces on said latest hit charts list with those on said hit charts list held in said user terminal.

6. The music distribution method according to claim 1, wherein said terminal is a portable terminal having a music playback function, one or more downloading terminals are connected to said server via a network, and said determining step and said downloading step are performed by connecting to said downloading terminal said portable terminal or a storage medium to be loaded in said portable terminal.

7. The music distribution method according to claim 6, further comprising the steps of:
    downloading a latest hit charts list including places, titles and singer names to said downloading terminals from said server; and
    updating a hit charts list of the user stored in said portable terminal or said storage medium based on said latest hit charts list.

8. A music distribution system comprising:
    a server for storing a lot of music data; and
    means responsive to a request from a user for downloading, from said server, music data for one or more musical pieces included in a given latest hits chart, wherein said downloading means including:
    means for receiving said request at said server, wherein said request contains a chosen number associated with a given latest hits chart;

means for selecting musical pieces from the given latest hits chart that have a numerical ranking not greater than said chosen number;

for each musical piece selected, means for determining music data to be downloaded, said music data associated with respective selected musical pieces;

means for determining whether music data to be downloaded from said server are already stored in a terminal of said user; and means for selectively downloading, from said server to said terminal, only music data that are not stored in said terminal.

9. The music distribution system according to claim 8, wherein said downloading means downloads, from said server to said terminal, a latest hit charts list including places, titles and singer names, in addition to said music data.

10. The music distribution system according to claim 9, further comprising means for updating a hit charts list of the user stored in said terminal based on said latest hit charts list.

11. The music distribution system according to claim 10, wherein said determining means includes means for comparing the titles of musical pieces on said latest hit charts list with those on said hit charts list of said user.

12. The music distribution system according to claim 11, wherein said determining means includes means for transmitting said hit charts list of said user to said server, and said comparing means is provided in said server.

13. The music distribution system according to claim 8, wherein said downloading means deletes music data that are stored in said terminal and are not included in said latest hit charts.

14. The music distribution system according to claim 8, wherein said terminal is a personal computer.

15. The music distribution system according to claim 8, wherein said terminal is a portable terminal having a music playback function, one or more downloading terminals are connected to said server via a network, and said determining means and said selectively downloading means are provided in said downloading terminal to perform said determination and said selective downloading by connecting to said downloading terminal said portable terminal or a storage medium to be loaded in said portable terminal.

* * * * *